Dec. 15, 1953   D. A. McCAULAY ET AL   2,662,925
ISOMERIZATION OF XYLENES
Filed June 29, 1951
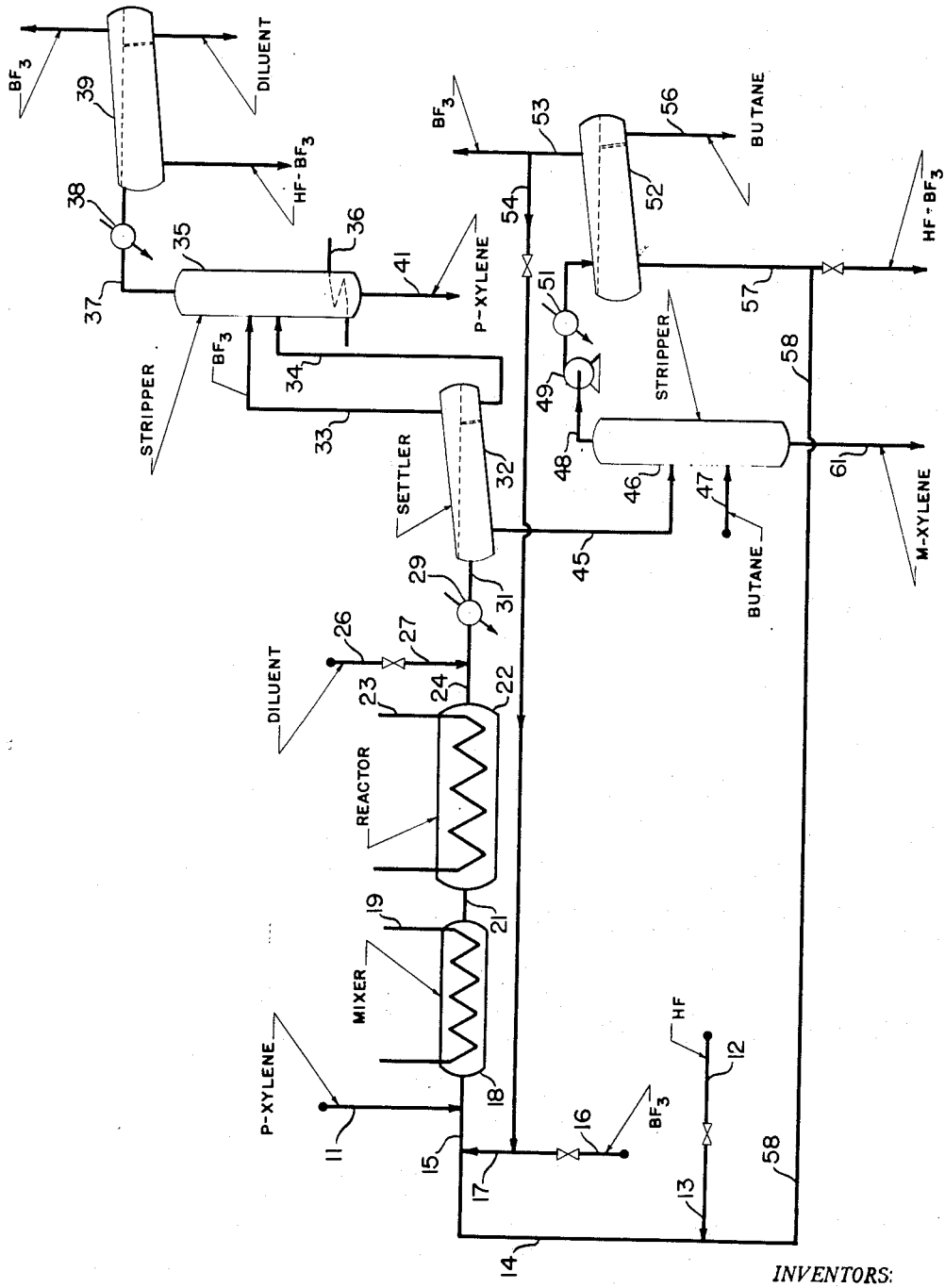
INVENTORS:
DAVID A. McCAULAY
ARTHUR P. LIEN
BY: Michael Dufincey
ATTORNEYS Patented Dec. 15, 1953

2,662,925

UNITED STATES PATENT OFFICE 2,662,925

ISOMERIZATION OF XYLENES

David A. McCaulay, Chicago, Ill., and Arthur P. Lien, Highland, Ind., assignors to Standard Oil Company, Chicago, Ill., a corporation of Indiana Application June 29, 1951, Serial No. 234,414

15 Claims. (Cl. 260—668)

This invention relates to the isomerization of para-xylene, ortho-xylene or a mixture of C8 aromatics. More particularly it relates to the production of meta-xylene by the isomerization of para-xylene and/or ortho-xylene. Still more particularly, it relates to the isomerization of para-xylene, ortho-xylene or mixtures of C8 aromatics in the presence of a catalyst consisting essentially of liquid hydrogen fluoride and BF3.

The present commercial polystyrene resins have a softening point below the boiling point of water. This defect has encouraged a search for resins of this type with higher softening points. It has been found that substantially pure dimethylstyrene polymerizes to a resin with a softening point in excess of 100° C. In the high temperature dehydrogenation of ethylxylenes to produce dimethylstyrenes, 1,3,5-ethylxylene has been found to be a preferred feed stock. High purity meta-xylene is valuable as a starting material for this synthesis. An object of our invention is the production of a high purity meta-xylene fraction suitable for this use.

Another object of our invention is to effect xylene isomerization without encountering side reactions such as cracking and disproportionation of said xylenes. A further object is to avoid the severe operating conditions heretofore employed for effecting xylene isomerization with HF–BF3 catalysts. Other objects will be apparent as the detailed description of our invention proceeds.

Xylenes react with BF3 (1 mol of BF3 per mol of xylene) to form complexes which are soluble in liquid HF. These complexes differ in stability; meta is the most stable and para the least stable. It is probable that the complex includes one or more mols of HF per mol of xylene-BF3. We have discovered that para-xylene isomerizes to meta-xylene, and that ortho-xylene isomerizes to meta-xylene, when the xylene is complexed with sufficient BF3 to render all the xylene soluble in liquid HF and the liquid HF solution of xylene-BF3 complex is maintained at less than about 90° F. The degree of isomerization is dependent upon the length of time that the BF3-xylene complex liquid-HF solution is maintained at the reaction temperature. The amount of meta-xylene present in the product increases with increase in reaction time until a definite equilibrium composition is reached.

It is necessary that sufficient liquid HF be present to dissolve all the BF3-xylene complex formed. The presence of HF in excess of this minimum amount is preferable because the HF helps to catalyze the isomerization. Thus the amount of liquid HF used is between 50 volume percent, based on xylenes charged, to about 600 volume percent; preferably about 100 to about 300 volume percent should be used; we have found that particularly good results are obtained when using about 200 volume percent of liquid HF, based on xylene feed. Since water reacts very rapidly with BF3 to form undesired hydrates, the liquid HF should be substantially anhydrous and in no case should more than 1 or 2% of water be present.

We have discovered that at about ambient temperature the isomerization will proceed in appreciable yield only when all the xylenes are brought into solution in the liquid HF (which condition will be spoken of in this specification as the homogeneous phase). The homogeneous phase can be attained with ortho-xylene when slightly less than 1 mol of BF3 is used per mol of ortho-xylene as the complex appears to solubilize the uncomplexed ortho-xylene. However, we prefer to use at least 1 mol of BF3 with ortho-xylene as the degree of isomerization increases with complete complexing of the ortho-xylene. Because the stability of the para-xylene-BF3 complex is less than that of the ortho-xylene complex, at least 1 mol of BF3 is needed per mol of para-xylene in order to attain a homogeneous phase. Although good results are obtained when using the minimum amount of BF3 necessary to form a homogeneous phase, larger amounts can be used. We prefer to use from 1 to about 5 mols of BF3 and particularly good results are obtained when using from about 1.5 to about 3 mols of BF3 per mol of xylene.

The presence of inert, HF-insoluble hydrocarbons such as propane, butane, pentane, light naphtha, benzene, toluene, etc. has been discovered to be detrimental to the degree of isomerization attainable. These hydrocarbons are referred to herein as diluents even though they are not appreciably soluble in liquid HF. The diluent acts like a solvent to draw some of the xylene out of the acid phase even though, theoretically, sufficient BF3 has been used to complex completely all the xylenes present. The liquid HF contains an equilibrium mixture of the BF3-xylene complex and free-xylene. As the diluent selectively draws out the free xylene, the complex dissociates to give more free-xylene. Thus if enough diluent is present, the ortho and para-xylene complexes can be more or less completely dissociated and the free-xylene removed by the diluent. The meta-xylene is so firmly held in the BF3-complex that it is possible to selectively separate the para and ortho-xylenes from the meta-xylene by the use of a diluent. We have found that those xylenes present in the portion of the diluent that does not dissolve in the homogeneous phase (raffinate phase) are not isomerized even though a large excess of $BF_3$ may be present in the reactor. If the amount of diluent used is very large, isomerization of the para and ortho-xylenes may be substantially halted. Therefore, in our process diluents should be avoided, at least in amounts large enough to form a separate phase distinct from the liquid $HF-BF_3$ complex homogeneous phase.

We have found that the degree of isomerization attainable in the homogeneous phase is dependent upon both temperature and reaction time. The reaction temperature that may be used is limited by the fact that at upwards of about 90° F. appreciable amounts of undesirable byproducts are obtained due to disproportionation of the xylenes. It does not appear to be possible to isomerize either the para-xylene or the ortho-xylene completely to the meta-isomer. At about 90° F. the equilibrium composition appears to be about 95% meta-xylene and 5% para-xylene for the para-isomerization; for the ortho-isomerization at about 90° F., the equilibrium composition is about 90% meta-xylene and about 10% ortho-xylene. The high meta-xylene content of the equilibrium mixture is unexpected. The thermodynamic equilibrium mixture contains only about 60% meta-xylene.

At about 90° F. the isomerization of para-xylene reaches the equilibrium composition in about 150 to 200 minutes. As the reaction temperature is decreased the length of time needed to reach equilibrium increases so that at about 70° F. the reaction time must be from about 200 to 350 minutes and about 60° F. the reaction time must be from about 300 to 600 minutes.

For the isomerization of ortho-xylene more time is needed to reach equilibrium than is needed for the para-xylene isomerization, when both reactions are carried out at the same temperature. By raising the reaction temperature for the ortho-isomerization about 20° F. equilibrium can be attained in about the same time needed for the isomerization of para-xylene at the lower temperature. The maximum temperature of about 90° F., in order to avoid disproportionation to undesirable by-products, applies to the isomerization of either the para-xylene, the ortho-xylene, mixtures of the two, or mixtures of isomeric xylenes and ethylbenzene. At about 90° F. the ortho-xylene isomerization attains the equilibrium composition in from about 200 to 300 minutes, and at 80° equilibrium is attained in 300 to 600 minutes. At about 70° F. the ortho-isomerization attains equilibrium in from about 600 to about 1000 minutes.

The above reaction times apply to the case of maximum possible conversion to the meta-isomer; product mixtures containing less than the maximum amount of the meta-isomer can be obtained by decreasing the reaction time. For example, a product containing 50% para-xylene and 50% meta-xylene can be obtained at 86° F. in 11 minutes; at 68° F., 28 minutes; and at 0° F., 20 hours.

Usually our process will be operated at ambient temperature. However, it is possible to operate at temperatures as low as 0° F. and even lower if the correspondingly increased reaction times to attain the desired product composition can be tolerated. We prefer to operate at temperatures from about 50° to about 85° F. with about 75° F. representing a good compromise of temperature and reaction time for a commercial process.

As illustrations of the results obtainable by our process, data from many runs are presented in Tables I, II and III.

The isomerization of para-xylene is illustrated by the runs in Table I. These data show very clearly the effect of temperature and reaction time on the composition of the product. Run 12 shows the effect of n-heptane as a diluent on the degree of isomerization. Even though the extract phase showed a conversion of 74% of the xylenes contained therein to the meta-isomer, it is noteworthy that 95% of the xylenes in the raffinate phase were the para-isomer. Run 11 shows that at a reaction temperature of 86° F. and 1435 minutes reaction time, only about 2% of the total xylenes were disproportionated into by-products such as benzene, toluene and trimethylbenzene.

In Table II there are presented runs on the isomerization of a mixture of meta-xylene, para-xylene and ethylbenzene. In run 13 only 0.4 of a mol of $BF_3$ was used per mol of the feed. The product distribution shows that the ethylbenzene was disproportionated to 1,3-diethylbenzene, 1,3,5-ethylxylene and other ethylxylenes. Very little isomerization of the para-xylene was obtained in this run even though a temperature of 75° F. and 210 minutes reaction time were used. Runs 14 and 15 are identical except for the amount of liquid HF used. These runs show that when the amount of liquid HF was increased from 100 volume percent to 200 volume percent, the degree of isomerization of the para-xylene was increased by about 50%. Run 16 shows the effect on the degree of isomerization of complexing all the xylenes. Taking into account the effect of the increased amounts of HF in run 16, the degree of isomerization in run 16 is almost threefold greater than that of run 13.

TABLE I

*Isomerization of para-xylene*

| Run No. | 1 | 2 | 3 | 4 | 5 | 6 | 7 | 8 | 9 | 10 | 11 | 12 | | |
|---|---|---|---|---|---|---|---|---|---|---|---|---|---|---|
| Charge: | | | | | | | | | | | | | | |
| HF (V. percent on xylene) | 200 | 200 | 200 | 200 | 200 | 67 | 200 | 200 | 200 | 200 | 200 | 200 | | |
| $BF_3$ (mols/mol xylene) | 1.56 | 1.56 | 1.56 | 1.56 | 1.56 | 1.51 | 1.01 | 1.58 | 1.58 | 1.58 | 1.58 | 1.83 | | |
| n-Heptane (V. percent on xylene) | | | | | | | | | | | | 50 | | |
| Temp., °F. | 37 | 37 | 37 | 37 | 37 | 37 | 68 | 86 | 86 | 86 | 86 | 50 | | |
| Reaction time, min. | 15 | 45 | 105 | 225 | 1,260 | 120 | 90 | 25 | 55 | 115 | 1,435 | 120 | | |
| | | | | | | | | | | | | Raff[1] | Extr.[2] | Total |
| Product distribution (mol. percent): | | | | | | | | | | | | | | |
| m-Xylene | 13 | 27 | 42 | 61 | 88 | 28 | 68 | 80 | 89 | 95 | 95 | 5 | 74 | 61 |
| p-Xylene | 87 | 73 | 58 | 39 | 12 | 72 | 32 | 20 | 11 | 5 | 5 | 95 | 26 | 39 |
| Percent disproportionation | 0 | 0 | 0 | 0 | 0 | 0 | 0 | 0 | 0 | 0. | 2 | 0 | 0 | |

[1] Contains 19% of feed xylene.
[2] Contains 81% of feed xylene.

TABLE II
*Isomerization of a mixture of m-xylene, p-xylene and ethylbenzene*

| Run No. | 13 | | | | 14 | | 15 | | 16 | | | |
|---|---|---|---|---|---|---|---|---|---|---|---|---|
| Charge: | | | | | | | | | | | | |
| m-Xylene, mols | 1.63 | | | | 1.61 | | 0.81 | | 0.82 | | | |
| p-Xylene, mols | 1.62 | | | | 1.62 | | .81 | | .81 | | | |
| Ethylbenzene, mols | 1.52 | | | | 1.62 | | .81 | | .81 | | | |
| HF (V. percent on xylenes) | (100) | | | | (100) | | (200) | | (200) | | | |
| BF$_3$ (mols/mol xylenes) | 0.41 | | | | 1.01 | | 1.05 | | 1.10 | | | |
| n-Heptane (V. percent on xylenes) | | | | | | | | | (100) | | | |
| Temp., °F | 75 | | | | 70 | | 70 | | 75 | | | |
| Reaction time, min | 210 | | | | 30 | | 30 | | 30 | | | |

| | Raff. | Ext. | Total | Percent | Total | Percent | Total | Percent | Raff. | Ext. | Total | Percent |
|---|---|---|---|---|---|---|---|---|---|---|---|---|
| Product distribution (mols): | | | | | | | | | | | | |
| Benzene | 0.19 | 0.10 | 0.29 | 6.0 | 0.65 | 13.4 | 0.38 | 15.6 | 0.12 | 0.10 | 0.22 | 9.2 |
| m-Xylene | .60 | 1.06 | 1.66 | 34.1 | 2.01 | 41.5 | 1.19 | 49.0 | .06 | 1.05 | 1.11 | 45.4 |
| p-Xylene | 1.05 | .37 | 1.42 | 29.2 | .94 | 19.4 | .30 | 12.3 | .37 | .11 | .48 | 19.7 |
| Ethylbenzene | .97 | .26 | 1.23 | 25.2 | .55 | 11.3 | .18 | 7.4 | .36 | .07 | .43 | 17.6 |
| 1,3,5-ethylxylene | | .07 | .07 | 1.4 | .17 | 3.5 | .04 | 1.6 | .00 | .02 | .02 | .8 |
| 1,3-diethylbenzene | .12 | .04 | .16 | 3.3 | .53 | 10.9 | .33 | 13.7 | .00 | .17 | .16 | 6.5 |
| Other | .03 | .01 | .04 | .8 | .00 | | .01 | .4 | .00 | .02 | .02 | .8 |
| Percent p-xylene isomerized to m-xylene | 12 | | | | 42 | | 63 | | 41 | | | |

TABLE III
*Isomerization of ortho-xylene*

| Run No. | 17 | 18 | 19 | 20 | 21 | 22 |
|---|---|---|---|---|---|---|
| Charge: | | | | | | |
| HF (V. percent on xylene) | 200 | 200 | 200 | 200 | 200 | 200 |
| BF$_3$ (mols/mol xylene) | 1.60 | 1.60 | 1.60 | 1.60 | 1.60 | 1.03 |
| Temp., °F | 56 | 56 | 56 | 56 | 56 | 68 |
| Reaction time, min | 25 | 100 | 230 | 400 | 1,435 | 90 |
| Product distribution: | | | | | | |
| m-Xylene | 7 | 25 | 43 | 57 | 82 | 44 |
| o-Xylene | 93 | 75 | 57 | 43 | 18 | 56 |
| Percent disproportionation | 0 | 0 | 0 | 0 | 0 | 0 |

In Table III are presented data on the isomerization of ortho-xylene. Our data show that within the error of the analytical procedures used, the isomerization of para-xylene in our process produces no ortho-xylene; and the isomerization of ortho-xylene in our process produces no para-xylene. This is a wholly unexpected and very surprising result of our process.

The following typical runs illustrate the experimental procedure used and results obtainable by our process.

RUN 7

The apparatus employed was a 1570 ml. carbon steel autoclave fitted with a 1725 R. P. M. mechanical stirrer. A 258.5 gram (2.43 mols) sample of para-xylene, and 600 ml. of substantially anhydrous liquid HF and 170 grams (2.50 mols) of BF$_3$ were added to the reactor. The reaction mixture was agitated at 68° F. for 90 minutes. At the end of this time the mixture was allowed to settle for 10 minutes.

The contents of the reactor were withdrawn into a Dry Ice-cooled flask containing about 700 ml. of water. The flask containing the reactants and water was allowed to warm to room temperature. The decomposition of the BF$_3$-complexes by the water resulted in the separation of an oil phase and an aqueous HF–BF$_3$ phase. The oil phase was withdrawn and washed with ammonium hydroxide to remove traces of dissolved HF and BF$_3$. The oil product was fractionated through a column containing 30 theoretical plates. In this run the distillation indicated that all the hydrocarbons consisted of C$_8$ alkylbenzenes. The product distribution was determined by ultraviolet absorption analysis. This analysis indicated that only para-xylene and meta-xylene were present in the hydrocarbon product. The para-xylene had been isomerized to metaxylene to the extent of 68 mol. percent.

RUN 12

Para-xylene, with 50 volume percent n-heptane diluent, 200 volume percent of liquid HF and 1.83 mols of BF$_3$ per mol of para-xylene was introduced into the reactor. After stirring for 120 minutes at 50° F., the reactor was found to contain two phases. The heavier extract phase was withdrawn into a flask containing water to decompose the BF$_3$-complexes. The raffinate phase was then withdrawn from the reactor and washed with ammonium hydroxide to remove traces of dissolved HF and BF$_3$. The n-heptane was stripped from the raffinate phase leaving a hydrocarbon product representing 19% of the para-xylene feed; the raffinate xylenes analyzed 5% meta-xylene and 95% para-xylene. The distillation of the hydrocarbons in the extract phase indicated only xylenes were present. Analysis of this product showed 74% meta-xylene and 26% para-xylene. Thus even with a very large molar excess of BF$_3$ present, that is, more than the theoretical 1 mol per mol of xylene needed to complex all the xylenes, the addition of only 50% of diluent removed almost 20% of the para-xylene charged from the acid solution into the diluent where essentially no isomerization took place.

RUN 6

A mixture of para-xylene, BF$_3$ (1.51 mols per mol of para-xylene) and 67 volume percent of liquid HF were charged to the reactor. The mixture was stirred for 120 minutes at 37° F. Analysis of the product showed that only 28% of the para-xylene was isomerized to the meta-isomer. Comparison of this run with those at higher HF levels shows that the liquid HF has some catalytic effect on the degree of isomerization as well as acting as a solvent for the xylene-$BF_3$ complex.

*Large scale operation*

The accompanying drawing shows one embodiment of our process for the production of substantially pure meta-xylene by the isomerization of para-xylene. It is to be understood that this embodiment is shown for purposes of illustration only and that many other variations of our process can be readily devised by those skilled in the art.

In this illustration the charge consists of para-xylene from a source 11. However, the charge could be a mixture of para and ortho-xylenes, ortho-xylene alone, a mixture of meta, para-xylene and ethylbenzene, or even the total xylene-ethylbenzene fraction such as is obtained from the hydroforming of petroleum naphthas. Liquid HF from source 12 is passed through valved line 13 into line 14 and on into line 15. $BF_3$ from source 16 is passed through a valved line 17 into line 15 where it meets the liquid HF. Para-xylene from source 11 passes into line 15 and the contents of line 15 are passed into mixer 18 where the para-xylene-$BF_3$-liquid HF are thoroughly commingled. Mixer 18 is provided with a cooling coil 19 to withdraw the heat of reaction released during the formation of the $BF_3$-xylene complex. The reactants pass from mixer 18 through line 21 into reactor 22 which is provided with a coil 23. Coil 23 can be used either to cool or to heat the contents of the reactor in order to maintain relatively constant temperature in the reactor. Temperature in the reactor can be maintained at any point between about 0° F. and about 90° F.; preferably the maximum temperature is held below about 85° F.; a temperature in the range of 65° to 75° F. gives shortest reaction times consistent with ease of temperature control. The reactants are held in reactor 22 for a time sufficient to obtain the desired degree of isomerization. This time may vary from as little as 15 minutes at about 90° F. to more than 24 hours. We prefer to hold the reactor at about 75° F. for a reaction time of about 200 minutes.

The equilibrium composition of the product is almost entirely meta-xylene. If, however, an essentially pure meta-xylene product is desired the para-xylene contaminant can be eliminated by introduction of a countersolvent in the form of a diluent. The reactants pass from reactor 22 into line 24 where they are contacted by the diluent (which serves also as a quench liquid) from source 26 which enters line 24 through valved line 27. The diluent must be inert to the action of liquid HF and/or $BF_3$. Suitable materials are propane, butane, benzene, toluene, etc. The diluent is used in large enough quantity to dissolve substantially all the para-xylene into the diluent rich raffinate phase, which takes place even though enough $BF_3$ is present to theoretically complex all the xylenes. It is preferred that from about 200 to 400 volume percent, based on para-xylene feed, of diluent be used.

The diluted-reaction mixture passes through line 28, cooler 29, and line 31 into settler 32. The diluted reactants are cooled in order to decrease the isomerization of the meta-xylene that is present in the acid phase. The removal of the para-xylene by the diluent into the raffinate phase normally would result in some isomerization of the meta-xylene to the equilibrium composition existing in the acid phase. Cooling of the reactants can be accomplished by the use of cold diluent alone or by the use of a heat exchanger. However, we prefer to use a combination of these methods.

In settler 32 the excess $BF_3$ is vented through line 33; the raffinate phase is separated and passed through line 34 into stripper 35. Stripper 35 is provided with a reboiler 36 which provides the heat needed to separate the diluent from the para-xylene. The diluent vapors and the $BF_3$ from settler 32 are taken overhead through line 37 through cooler-condenser 38 into separator 39.

In separator 39 the diluent is separated from liquid HF, saturated with $BF_3$. The diluent can be recycled to line 27 for reuse in the process. The liquid HF-$BF_3$ solution passes out of settler 39 and is recycled to line 13 for reuse in the process. The free $BF_3$ passes out of separator 39 and is recycled to line 17 for reuse in the process. The para-xylene bottoms from stripper 35 are passed out of the stripper through line 41 and are recycled to source 11 for reuse in the process.

The extract phase which contains liquid HF and substantially pure meta-xylene-$BF_3$ complex is withdrawn from settler 32 by line 45 and is passed into stripper 46. In order to prevent the isomerization of meta-xylene the decomposition of the complex is carried out under vacuum. While it is not absolutely necessary to do so, the operation may be facilitated by the use of a stripping agent such as propane or butane. The stripping agent herein, butane, is added to stripper 46 from source 47. The stripping agent, HF and $BF_3$ pass out of stripper 46 through line 48, through vacuum pump 49 and through cooler 51 into settler 52. Cooler 51 condenses the butane and the HF. Free $BF_3$ is removed from settler 52 through line 53; this is recycled to line 17 by way of valved line 54. The butane stripping agent is removed from settler 52 through line 56 and is recycled to stripper 46. The liquid HF, saturated with $BF_3$, is removed from settler 52 through line 57 and recycled, for reuse in the process, to line 14 by way of line 58. The substantially pure meta-xylene is removed from stripper 46 through line 61.

When the feed xylene to our process consists of ortho-xylene it is not necessary to take as stringent precautions to prevent the isomerization of the meta-xylene to the ortho form. In this case the use of a diluent to extract the ortho-xylene from the acid phase may be dispensed with if desired. The reaction mixture may be cooled and sent to the stripper where the HF and $BF_3$ are removed under vacuum. The total product is sent to a fractionating tower where a substantially pure ortho-xylene fraction and a substantially pure meta fraction are easily produced due to the difference in the boiling point of these two isomers.

We have previously discovered that ethylbenzene does not complex with HF and $BF_3$ but is very rapidly and substantially completely disproportionated in the presence of liquid HF and $BF_3$ to benzene, 1,3-diethylbenzene and unreacted ethylbenzene as described in our Patent U. S. 2,528,893. The benzene and unreacted ethylbenzene are very readily removed from the homogeneous phase by inert, HF-insoluble diluents such as propane and butane. The disproportionation of ethylbenzene can be carried out simultaneously with the isomerization of the para and ortho-xylenes, if sufficient $BF_3$ is added to complex the diethylbenzene and ethylxylenes formed in addition to the amount needed to complex the xylenes present. Although only 0.5 mol of BF₃ are needed theoretically, we prefer to use about 1 mol of BF₃ per mol of ethylbenzene, in order to maximize the degree of disproportionation.

Our process can operate on a feed consisting of a mixture of C₈ aromatics by using about 1 mol of BF₃ per mol of ethylbenzene present in the C₈ aromatic and at least 1 mol of BF₃ per mol of xylenes present. When operating on such a feed the reaction time should be long enough to disproportionate substantially all the ethylbenzene as well as long enough to attain the degree of isomerization desired. We prefer to extract the mixture leaving the reactor with butane to remove the benzene, unreacted para (and ortho) xylene and unreacted ethylbenzene from the acid phase. Thus we remove the HF and BF₃ from the mixture of metaxylene and diethylbenzene by vacuum stripping and thereafter separate the substantially pure meta-xylene from the diethylbenzene and ethylxylenes by distillation.

We claim:

1. A process for the isomerization of para-xylene to a product containing in excess of about 85 mol percent of meta-xylene which process comprises contacting under substantially anhydrous conditions said para-xylene with from at least 1 to about 3 mols of BF₃ per mol of para-xylene and with from about 100 to 300 volume percent, based on said para-xylene, of liquid HF in a single phase homogeneous solution at a temperature between about 60° F. and 90° F. for a time from about 150 to about 600 minutes, wherein the longer times are associated with the lower temperatures, and separating the HF and BF₃ from a product consisting of at least about 85 mol percent of meta-xylene and the remainder essentially para-xylene.

2. A process for the isomerization of para-xylene to a product containing in excess of about 85 mol percent of meta-xylene which process comprises contacting under substantially anhydrous conditions said para-xylene with from at least 1 to about 3 mols of BF₃ per mol of para-xylene and with from about 100 to 300 volume percent, based on para-xylene, of liquid HF in a single phase homogeneous solution and separating the HF and BF₃ from a product consisting of at least about 85 mol percent of meta-xylene and the remainder essentially para-xylene and wherein the contacting is carried out at a temperature-time relationship substantially as follows:

| ° F. | Minutes |
| --- | --- |
| 90 | 150–200 |
| 70 | 200–350 |
| 60 | 300–600 |

3. A process for the isomerization of ortho-xylene to a product containing in excess of about 80 mol percent of meta-xylene, which process comprises contacting under substantially anhydrous conditions said ortho-xylene with from at least 1 mol to about 3 mols of BF₃ per mol of ortho-xylene and with from about 100 to 300 volume percent, based on ortho-xylene, of liquid HF in a single phase homogeneous solution at a temperature between about 70° F. and 90° F. for a time from about 200 to about 1000 minutes, wherein the longer times are associated with the lower temperatures, and separating the HF and BF₃ from a product consisting of at least about 80 mol percent of meta-xylene and the remainder essentially ortho-xylene.

4. A process for the isomerization of ortho-xylene to a product containing in excess of about 80 mol percent of meta-xylene, which process comprises contacting under substantially anhydrous conditions said ortho-xylene with from at least 1 to about 3 mols of BF₃ per mol of ortho-xylene and with from about 100 to 300 volume percent, based on ortho-xylene, of liquid HF in a single phase homogeneous solution and separating the HF and BF₃ from a product consisting of at least about 80 mol percent of meta-xylene and the remainder essentially ortho-xylene, and wherein the contacting is carried out at a temperature-time relationship substantially as follows:

| ° F. | Minutes |
| --- | --- |
| 90 | 200–300 |
| 80 | 300–600 |
| 70 | 600–1,000 |

5. A process which comprises contacting under substantially anhydrous conditions a feed comprising essentially a member of the class consisting of ortho-xylene, para-xylene, mixtures thereof and mixtures of meta-xylene and at least one other xylene isomer wherein the meta-xylene is present in an amount appreciably less than the theoretical thermodynamic equilibrium amount, with at least about 1 mol of BF₃ per mol of xylene in said feed and with at least sufficient liquid HF to form a single phase homogeneous solution of said feed and BF₃ in said liquid HF, maintaining said solution at a temperature between about 0° and 90° F. for a time at least sufficient to produce a reaction product mixture containing an amount of meta-xylene appreciably greater than the theoretical thermodynamic equilibrium amount, and removing the HF and BF₃ from the reaction product mixture.

6. The process of claim 5 wherein said liquid HF is present in an amount between about 50 and 600 volume percent based on said feed.

7. The process of claim 5 wherein the temperature is maintained between about 50° and 85° F.

8. The process of claim 5 wherein said feed consists essentially of para-xylene.

9. The process of claim 5 wherein said feed consists essentially of ortho-xylene.

10. The process of claim 5 wherein said product mixture contains at least about 80 mol percent of meta-xylene.

11. The process of claim 5 wherein (a) the single phase homogeneous solution of HF, reaction product mixture and BF₃ is contacted at a temperature between about 0° and 90° F. with a liquid hydrocarbon diluent that is substantially insoluble in and inert to the action of liquid HF–BF₃ agent and that is readily separable from xylene by a distillation process, in an amount between about 100 and 300 volume percent based on said feed, (b) a raffinate phase, which consists essentially of said diluent and dissolved xylenes, is separated from an extract phase consisting essentially of HF, BF₃ and xylenes, and (c) said extract phase is processed to recover a xylene product that is substantially pure meta-xylene.

12. A process which comprises contacting under substantially anhydrous conditions a feed comprising essentially a member of the class consisting of (a) a natural mixture of $C_8$ aromatic hydrocarbons and (b) a mixture of $C_8$ aromatic hydrocarbons derived by distillative separation of a natural mixture of $C_8$ aromatic hydrocarbons, which feed contains an amount of meta-xylene appreciably less than the theoretical thermodynamic equilibrium amount, with at least about 1 mol of $BF_3$ per mol of $C_8$ aromatic hydrocarbons in said feed and with at least sufficient liquid HF to form a single phase homogeneous solution of said feed and associated $BF_3$ in said liquid HF, maintaining said solution at a temperature between about 0° and 90° F. for a time at least sufficient to produce a reaction product mixture containing meta-xylene appreciably in excess of the theoretical thermodynamic equilibrium amount, removing the HF and $BF_3$ from the reaction product mixture, and recovering a product mixture of $C_8$ aromatic hydrocarbons containing an amount of meta-xylene appreciably in excess of the theoretical thermodynamic equilibrium amount from said reaction product mixture.

13. The process of claim 12 wherein (i) the solution of HF, reaction product mixture and $BF_3$ is contacted at a temperature between about 0° and 90° F. with a liquid hydrocarbon diluent that is substantially insoluble in and inert to the action of liquid HF–$BF_3$ agent and that is readily separable from xylene by a distillation process, in an amount between about 100 and 300 volume percent based on said feed, (ii) a raffinate phase, which consists essentially of said diluent, product benzene, ethylbenzene and xylenes, is separated from an extract phase consisting of HF, $BF_3$ and aromatic hydrocarbons and (iii) said extract phase is processed to recover a $C_8$-aromatic hydrocarbon product that is substantially pure meta-xylene.

14. The process of claim 12 wherein the $C_8$ aromatic hydrocarbon product mixture contains at least about 80 mol percent of meta-xylene.

15. A process which comprises contacting under substantially anhydrous conditions a feed comprising essentially a member of the class consisting of ortho-xylene, para-xylene, mixtures thereof and mixtures of meta-xylene and at least one other xylene isomer wherein the meta-xylene is present in an amount appreciably less than the theoretical thermodynamic equilibrium amount, with between about 1 mol and 3 mols of $BF_3$ per mol of xylene in said feed and with between about 100 and 300 volume percent of liquid HF based on said feed to form a single phase homogeneous solution of said feed and $BF_3$ in said liquid HF, maintaining said solution at a temperature between about 50° and 85° F. for a time at least sufficient to produce a reaction product mixture containing at least about 80 mol percent of meta-xylene but not long enough to produce essentially any side-reaction products and removing the HF and $BF_3$ from the reaction product mixture.

DAVID A. McCAULAY.
ARTHUR P. LIEN.

References Cited in the file of this patent

UNITED STATES PATENTS

| Number | Name | Date |
|---|---|---|
| 2,521,444 | Brooke et al. | Sept. 7, 1950 |
| 2,527,825 | Kemp | Oct. 31, 1950 |
| 2,564,073 | Lien et al. | Aug. 14, 1951 |